Dec. 6, 1932.  J. E. KILZER  1,890,223
DRILL PIPE FLOAT COUPLING
Filed Feb. 13, 1928
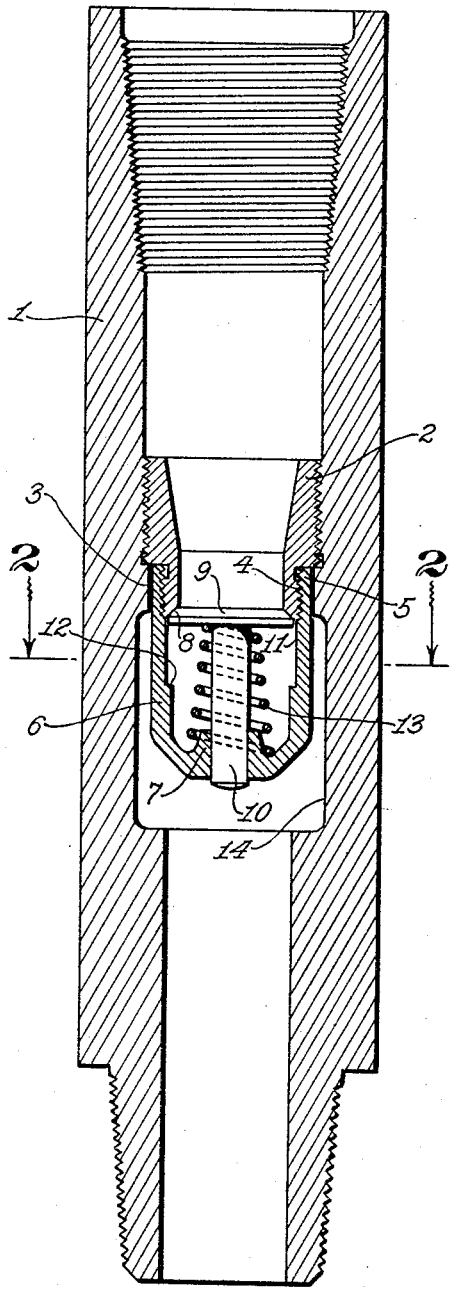
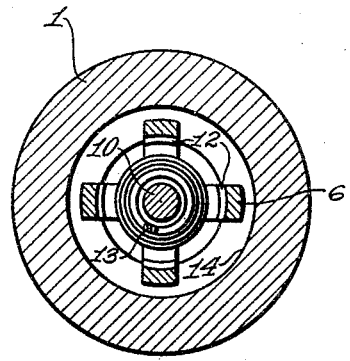
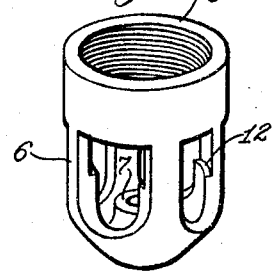
Inventor:
JAMES E. KILZER,
By John N Bruninga
His Attorney.

Patented Dec. 6, 1932

1,890,223

UNITED STATES PATENT OFFICE

JAMES E. KILZER, OF ST. LOUIS, MISSOURI, ASSIGNOR TO JOHN J. LARKIN, OF ST. LOUIS, MISSOURI

DRILL PIPE FLOAT COUPLING

Application filed February 13, 1928. Serial No. 253,873.

This invention pertains to drill pipe float couplings, such as are used in drilling operations on deep wells, such as oil wells and the like.

In the drilling of a deep well by the rotary method, the drilling bit is driven from the top of the well by means of a pipe shaft, known as a drill pipe. As this pipe becomes extremely long and heavy when the well gets deep, it is desirable to support it in some way other than by hanging the entire weight from the top of the well. It is the practice in this method of drilling to pump into the well during the drilling operation a fluid which is pumped down inside of the drill pipe and passes upwardly again outside of said pipe and flows out of the top of the well. This fluid carries out of the well the cuttings produced during the drilling operation. A simple method of supporting the weight of the drill pipe is to float the same; that is, to shut off a portion of the pipe by means of the valve, so that the pipe will float to some extent in the liquid in the well. For this purpose, a coupling is introduced at some point in the length of the drill pipe, in which coupling such a valve is mounted, and this is known as a drill pipe float coupling.

During the drilling operation, the liquid with which the well is flushed is pumped downwardly through the drill pipe, and the float valve is arranged to open downwardly so as to permit passage of the liquid and to close upon reverse pressure so that, when the pumping of the liquid is stopped, the pipe will float. Difficulty is experienced with this type of valve, which is frequently broken so that the valve drops out of its seat. As the lower passage in the pipe is usually smaller than the valve, the latter may lodge at the reduced portion of the pipe and shut off the downward flow of liquid.

One of the objects of this invention is to provide a valve for such a float coupling which will be less liable to breakage than valves at present in use.

Another object is to provide an improved construction which will prevent a broken valve from falling into the throat of the coupling so as to cut off the flow of liquid therethrough.

Another object is to provide a valve construction in which the valve spring is protected against overstrain so as to reduce the liability of breakage.

Another object is to provide a valve of simple construction, which will be strong and durable in service.

Further objects will appear from the following description, taken in connection with the accompanying drawing, in which—

Figure 1 is a longitudinal section of a drill pipe coupling embodying this invention;

Figure 2 is a section on line 2—2 of Figure 1; and

Figure 3 is a perspective view of the spider.

Referring to the drawing, 1 designates the body of the coupling, which is usually a section of drill pipe threaded at both ends in the usual manner, so that it may be connected between successive lengths of the drill pipe. The bore of the body 1 is suitably threaded to receive a bushing 2, which screws down against a shoulder 3 formed in the coupling 1. The bushing has a reduced portion below said shoulder, which is provided with a thread 4 adapted to have screwed thereon the threaded upper ring 5 of a spider or cage 6. The arms of the spider 6 extend downwardly from the ring 5 and are joined at their lower ends by a hub 7. The bushing 2 is provided with a conical valve seat 8 adapted to receive a valve 9 having a stem 10 which is guided in the bore of the hub 7. The head of the valve 9 is guided in its up and down movement by the arms of the spider 6, which are recessed along a portion thereof, as shown at 11, providing a shoulder 12 on each arm against which the valve head 9 will abut when moved downwardly to its extreme position, and which forms a stop to limit the movement of the valve. A valve spring 13, having a tapered form, surrounds the stem 10 and the hub 7, resting in the crotches of the arms of the spider, as shown in Figure 1.

In assembling the valve, the spring and the valve 9 are placed in the spider 6 and the same then screwed on to the bushing 2. After this, the assembled valve is screwed into the body 1 and against the shoulder 3.

In the use of this valve, the downward pressure of the liquid will force the valve 9 downwardly against the tension of the spring 13, so as to permit the liquid to flow past the valve and through the spider 6. The interior bore of the body 1 is enlarged around the spider 6, as shown at 14, so as to permit a free flow of liquid past the valve. The valve 9 may open as far as necessary to accommodate the flow of liquid until it comes against the stop 12, which arrests further movement. The stop 12 prevents the valve from being forced down far enough to jam the spring 13. This spring is constructed with a taper, so that when closely compressed, the successive turns will lie one within the other or partly so. It is, therefore, impossible to compress the spring 13 so tight as to jam the coils. The danger of breaking the spring is, therefore, greatly reduced. If the spring should be broken, the valve would not drop out of its mounting, but would simply move down to a position resting on the shoulder 12 and remain in that position with the valve open.

It is obvious that various changes may be made, within the scope of the appended claims, in the details of construction without departing from the spirit of this invention. It is, therefore, to be understood that this invention is not limited to the specific details shown and described.

Having thus described the invention, what is claimed is:

1. A drill pipe float coupling, comprising, a coupling adapted for connecting sections of drill pipe and having a fluid passage longitudinally therethrough, a valve seat member in said coupling, a cage member having depending arms and a stem guide below said seat member, a valve guided by said arms to move upwardly against said seat member and having a stem engaging said stem guide, and a spring adapted to move said valve upwardly against its seat.

2. A drill pipe float coupling, comprising, a coupling adapted for connecting sections of drill pipe and having a fluid passage longitudinally therethrough, a valve seat member in said coupling, a cage member having depending arms and a stem guide below said seat member, a valve guided by said arms to move upwardly against said seat member and having a stem engaging said stem guide, stops on said arms adapted to engage said valve at its periphery to limit its movement, and a spring adapted to move said valve upwardly against its seat.

3. A drill pipe float coupling, comprising, a coupling adapted for connecting sections of drill pipe and having a fluid passage longitudinally therethrough, a valve seat member detachably mounted in said coupling, a cage member attached to and depending from said seat member and having a hub, a valve guided in said cage member and having a stem guided in said hub, a spring for said valve, and a stop on said cage adapted to engage the periphery of said valve to limit the movement thereof.

4. A drill pipe float coupling, comprising, a coupling adapted for connecting sections of drill pipe and having a fluid passage longitudinally therethrough, a valve seat member detachably mounted in said coupling, a cage member attached to and depending from said seat member and having a hub, a valve guided in said cage member and having a stem guided in said hub, a spring for said valve, and a stop on said cage adapted to engage the periphery of said valve to limit the movement thereof and spaced so as to prevent jamming of said spring.

5. A drill pipe float coupling, comprising, a coupling adapted for connecting sections of drill pipe and having a fluid passage longitudinally therethru, a bushing mounted in said passage and having a valve seat at the lower end thereof, a valve cage, mounted on said bushing having arms extending downwardly therefrom and having a stem guide below said seat, a valve in said cage guided by said arms to move upwardly against said seat and having a downwardly projecting stem movable in said stem guide, and a spring adapted to retain said valve yieldingly against said seat.

6. A drill pipe float coupling, comprising, a coupling adapted for connecting sections of drill pipe and having a fluid passage longitudinally therethru, a bushing mounted in said passage and having a valve seat at the lower end thereof, a valve cage mounted on said bushing having arms extending downwardly therefrom and having a stem guide below said seat, a valve in said cage guided by said arms to move upwardly against said seat and having a downwardly projecting stem movable in said stem guide, a spring adapted to retain said valve yieldingly against said seat, and a stop on an arm of said cage adapted to limit the opening movement of said valve.

In testimony whereof I affix my signature this 10th day of February, 1928.

JAMES E. KILZER.